June 27, 1939.   D. M. WRIGHT   2,163,927
SEPARATION APPARATUS
Filed April 23, 1937
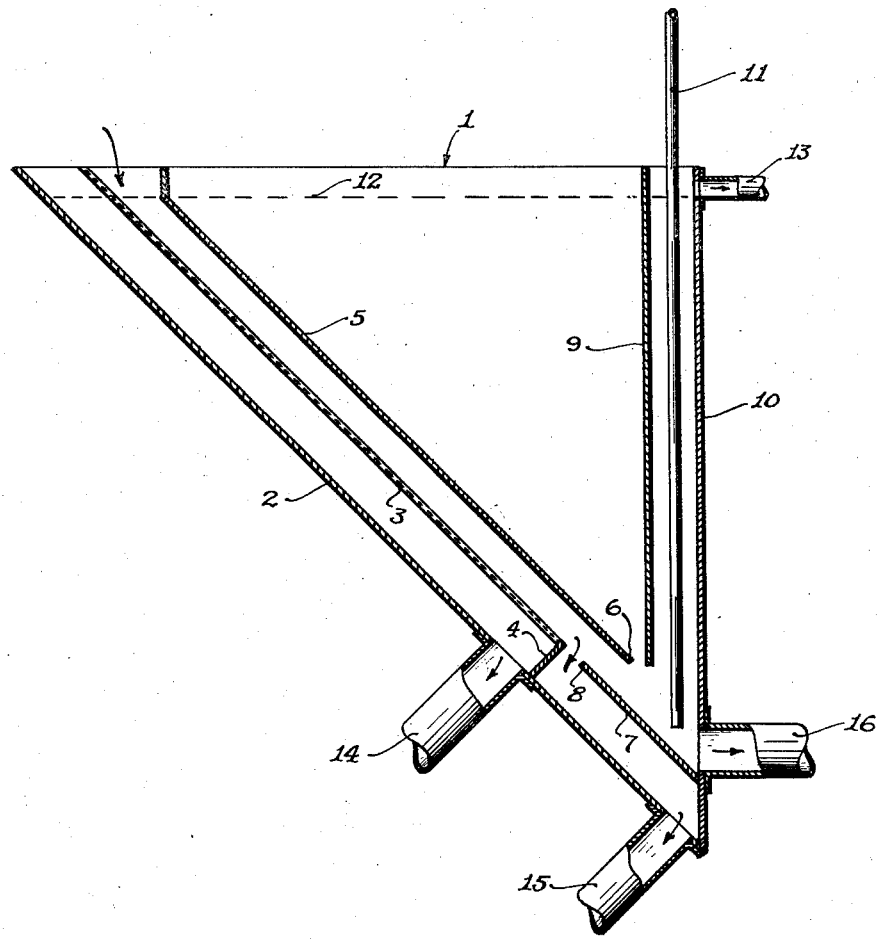
David M. Wright
INVENTOR
ATTEST- Patented June 27, 1939

2,163,927

UNITED STATES PATENT OFFICE 2,163,927

SEPARATION APPARATUS

David M. Wright, Agricola, Fla., assignor to Industrial Patents Corporation, Chicago, Ill., a corporation of Delaware Application April 23, 1937, Serial No. 138,671

6 Claims. (Cl. 209—12)

This invention relates to apparatus adapted for use in recovering phosphatic materials.

Specifically, the present invention is an improvement on the separation apparatus described and claimed in United States Letters Patent No. 2,006,471 entitled Separation apparatus to George H. McCoy, David M. Wright, and Jesse Pankey Hall.

The separation apparatus of United States Patent No. 2,006,471 includes a receptacle, means for maintaining substantially a constant level of water in the receptacle, and angularly disposed under water screens employed to effect a separation between agglomerated phosphate fines and silica, the silica passing through the screens and the phosphatic agglomerates passing over the screens, being separately withdrawn at the bottom.

In preparing phosphate bearing fines for treatment in accordance with the teachings of United States Patent No. 2,017,468 granted on the application of the same inventors as of United States Patent No. 2,006,471, the phosphate fines are selectively oiled to form agglomerates. After the initial screening operation by which the larger or pebble size particles of rock phosphate are recovered in accordance with usual practice, the fine portion of the mined material is subjected to a washing operation, during which a large portion of the dirt, sand, and other foreign material is removed. The remaining washed material which is a mixture of sand and rock phosphate of about equal size, is then conveyed to a mixer, where it is mixed with an agglomerating substance. The agglomerating substance may be of any suitable kind, it being necessary, however, that the material have the joint properties of, first, an affinity for the rock phosphate and not the sand particles, and, secondly, when applied to the rock phosphate particles, to cause such particles to adhere together by agglomeration, forming the smaller particles of rock phosphate into agglomerates, for a purpose hereinafter more specifically set forth.

Agglomeration is normally effected by an emulsion of soap and oil. Suitable materials are any kind of cheap mineral oil, such as fuel oil, and any fatty acid or rosin soap, preferably the former, of a cheap grade. These products are emulsified in a suitable apparatus with a small quantity of water, which is added thereto.

After the mixing process referred to, it will be found that the rock phosphate particles are agglomerated and exist in larger physical form than the particles of sand. The mixture is then fed forwardly and deposited onto an apparatus which is effective to mechanically separate the particles on the basis of their size, as by passing over a screen which will permit the smaller sand particles to fall through and the larger agglomerated particles of rock phosphate to pass over the screen.

In further practicing the process, after an initial separation has been accomplished as above described, the agglomerated particles may be again mixed and broken up and allowed to agglomerate a second time, all for the purpose of freeing any particles of sand or other impurities which may have been entrapped in the agglomerated particles in the first instance. After this operation, a second separation may be effected in the same manner, such as by passing over a second screen. This second step, is a refinement process and makes for a more purified final product. After the above described separating action, the sand and other impurities may be discarded and the agglomerated phosphatic material collected and prepared for further treatment.

I have found that when the treated material is fed to the screen, much of the fine sand tends to surge forward in the water and remain in suspension above the screen, settling by gravity near the discharge end of the tank on top of phosphate material about to be discharged. This results in this sand being included with the recovered phosphate instead of passing through the screen. The present invention provides an apparatus to prevent this behavior of the sand.

The invention will be readily understood by reference to the drawing, which is a diagrammatic representation of the separation apparatus of the present invention.

The separator of the present invention comprises a tank 1, which is preferably of the construction shown, namely, of a general triangular shape in cross section having an inclined bottom 2. The tank is provided with an inclined stationary screen 3 spaced above the floor 2. Screen 3 is appropriately mounted and terminates at its bottom end at wall 4. Inclined guard plate 5 is mounted above and in spaced, substantially parallel relationship with screen 3 and sufficiently close to screen 3 to prevent the material being screened from surging through the body of liquid contained in tank 1. The guard plate 5 is extended substantially over the entire screening area of screen 3 and at its lower end 6, terminates below wall 4. Inclined baffle plate 17 is fitted at the bottom of the tank as shown, having the same inclination as screen 3. Inclined baffle plate 7 terminates at its end 8 at a point below wall 4, providing an opening between end 8 and wall 4, which opening is above the lower end 6 of guard plate 5. Partition 9 is spaced from the end 10 of the tank 1. Pipe 11 is provided to supply water, which is preferably maintained at the level indicated by dotted line 12 and overflows through overflow pipe 13.

Obviously, the guard plate 5 may be terminated at its upper edge at the line of introduction of the material whether that line be above or below the liquid level 12.

The treated phosphate feed enters the tank at the upper end of screen 3 and passes down over screen 3. The fine sand, which tends to rise in the form of a cloud above screen 3, is restrained by guard plate 5, and much of it returned to the screen surface to pass therethrough. The sand passing through the screen is removed through outlet 14. The phosphate rock agglomerates, being larger in size than the screen mesh, pass over screen 3 and pass by gravity through the space between wall 4 and baffle plate 7 to be withdrawn through outlet 15. Such sand as remains in suspension above screen 3 at the time the material passes over the top of wall 4 continues above baffle plate 7 and may be withdrawn through outlet 15.

The apparatus of the present invention permits the production of phosphate rock agglomerates unusually free from sand since the lighter sand which normally does not pass through the screen in under water screening work is trapped by baffle plate 7 and prevented from accumulating with the agglomerates at the bottom of the tank.

Wall 4 obviously is provided to form a barrier for sand which passes through screen 3.

It will be understood that the present invention is not limited to the embodiment disclosed in the drawing, but is to be construed broadly as defined in the claims which follow.

I claim:

1. In an under-liquid screening device including a liquid receptacle and means for maintaining a body of liquid in the receptacle at a predetermined level, an angularly disposed screen mounted within the receptacle and below the liquid level, a guard plate mounted above the screen and in substantially parallel relationship therewith, the guard plate being extended substantially over the entire area of the screen and to the liquid level and sufficiently close to the screen to prevent material to be screened from surging through the body of liquid and an opening permitting passage of the body of liquid to either side of the guard plate at a point below the lower limit of the screen.

2. In an under-liquid screening device including a liquid receptacle and means for maintaining a body of liquid in the receptacle at a predetermined level, an angularly disposed screen mounted within the receptacle and below the liquid level, the screen being terminated short of one wall of the receptacle, a guard plate mounted above the screen and in substantially parallel relationship therewith, the guard plate being extended substantially over the entire area of the screen, to the liquid level and relatively close to the screen and adapted to prevent material to be screened from surging through the body of liquid, an opening permitting passage of the body of liquid to either side of the guard plate at a point below the lower limit of the screen and a baffle plate extending from said wall of the receptacle and terminating short of the screen.

3. In an under-liquid screening device including a liquid receptacle and means for maintaining a body of liquid in the receptacle at a predetermined level, an angularly disposed screen mounted within the receptacle and below the liquid level, the screen being terminated short of one wall of the receptacle, a guard plate mounted above the screen and in substantially parallel relationship therewith, the guard plate being extended substantially over the entire area of the screen, to the liquid level and relatively close to the screen and adapted to prevent material to be screened from surging through the body of liquid, an opening permitting passage of the body of liquid to either side of the guard plate at a point below the lower limit of the screen and a baffle plate extending from said wall of the receptacle and terminating short of the screen, the baffle plate being extended in substantially the same plane as the screen.

4. In an under-liquid screening device including a liquid receptacle and means for maintaining a body of liquid in the receptacle at a predetermined level, an angularly disposed screen mounted within the receptacle and below the liquid level, the screen being terminated short of one wall of the receptacle, a guard plate mounted above the screen and in substantially parallel relationship therewith, the guard plate being extended substantially over the entire area of the screen, to the liquid level and relatively close to the screen and adapted to prevent material to be screened from surging through the body of liquid, an opening permitting passage of the body of liquid to either side of the guard plate at a point below the lower limit of the screen, a baffle plate extending from said wall of the receptacle and terminating short of the screen, the baffle plate extended in substantially the same plane as the screen, means for removing material passed over the screen and beneath the baffle plate and means for removing material passed above the baffle plate.

5. In an under-liquid screening device including a liquid receptacle having an inclined bottom and substantially vertical side and end walls, and means for maintaining a body of liquid in the receptacle at a predetermined level, an angularly disposed screen spaced above the bottom and below the liquid level, the screen being terminated short of the end wall, a guard plate mounted above the screen and in substantially parallel relationship therewith, the guard plate being extended substantially over the entire area of the screen, to the liquid level and relatively close to the screen and adapted to prevent material to be screened from surging through the body of liquid, an opening permitting passage of the body of liquid to either side of the guard plate at a point below the lower limit of the screen and a baffle plate extending from the end wall and terminated short of the screen, the baffle plate being extended in substantially the same plane as the screen.

6. In an under-liquid screening device including a liquid receptacle and means for maintaining a body of liquid in the receptacle at a predetermined level, an angularly disposed screen mounted within the receptacle and below the liquid level, a guard plate mounted above the screen and in substantially parallel relationship therewith, the guard plate being extended substantially over the entire area of the screen and to the line of introduction of material to the screen and sufficiently close to the screen to prevent the material from surging through the body of liquid and an opening permitting passage of the body of liquid to either side of the guard plate at a point below the lower limit of the screen.

DAVID M. WRIGHT.

CERTIFICATE OF CORRECTION.

Patent No. 2,163,927.            June 27, 1939.

DAVID M. WRIGHT.

It is hereby certified that error appears in the printed specification of the above numbered patent requiring correction as follows: Page 1, second column, line 48, for the reference numeral "17" read 7; page 2, first column, line 18, for "15" read 16; and that the said Letters Patent should be read with this correction therein that the same may conform to the record of the case in the Patent Office.

Signed and sealed this 15th day of August, A. D. 1939.

Leslie Frazer (Seal)            Acting Commissioner of Patents.